Oct. 27, 1953  W. C. EDDY  2,657,047
CONTAINER FOR ENDLESS FILM REELS
Filed April 25, 1952  2 Sheets-Sheet 1
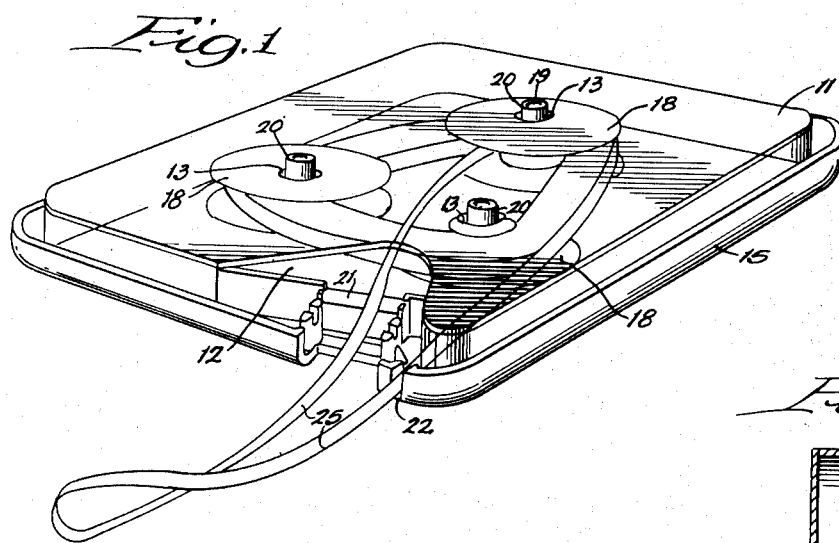
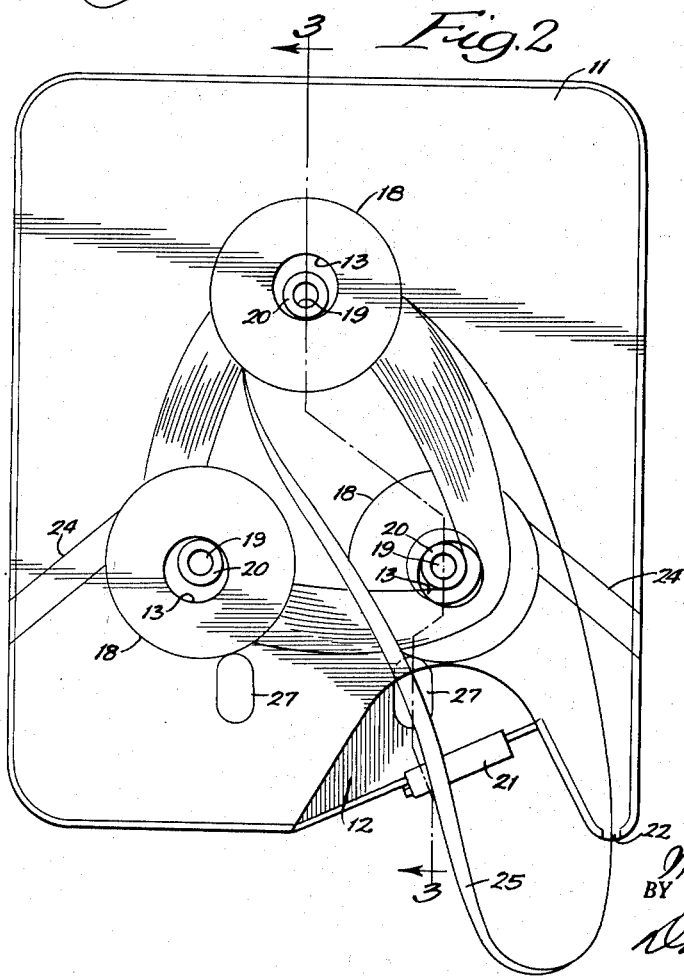
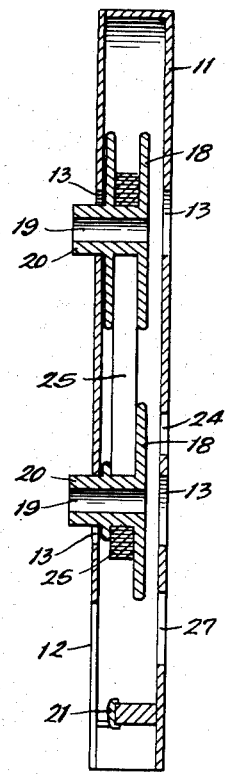
INVENTOR:
William C. Eddy,
BY
Dawson & Ooms,
ATTORNEYS.

Oct. 27, 1953 W. C. EDDY 2,657,047
CONTAINER FOR ENDLESS FILM REELS
Filed April 25, 1952 2 Sheets-Sheet 2
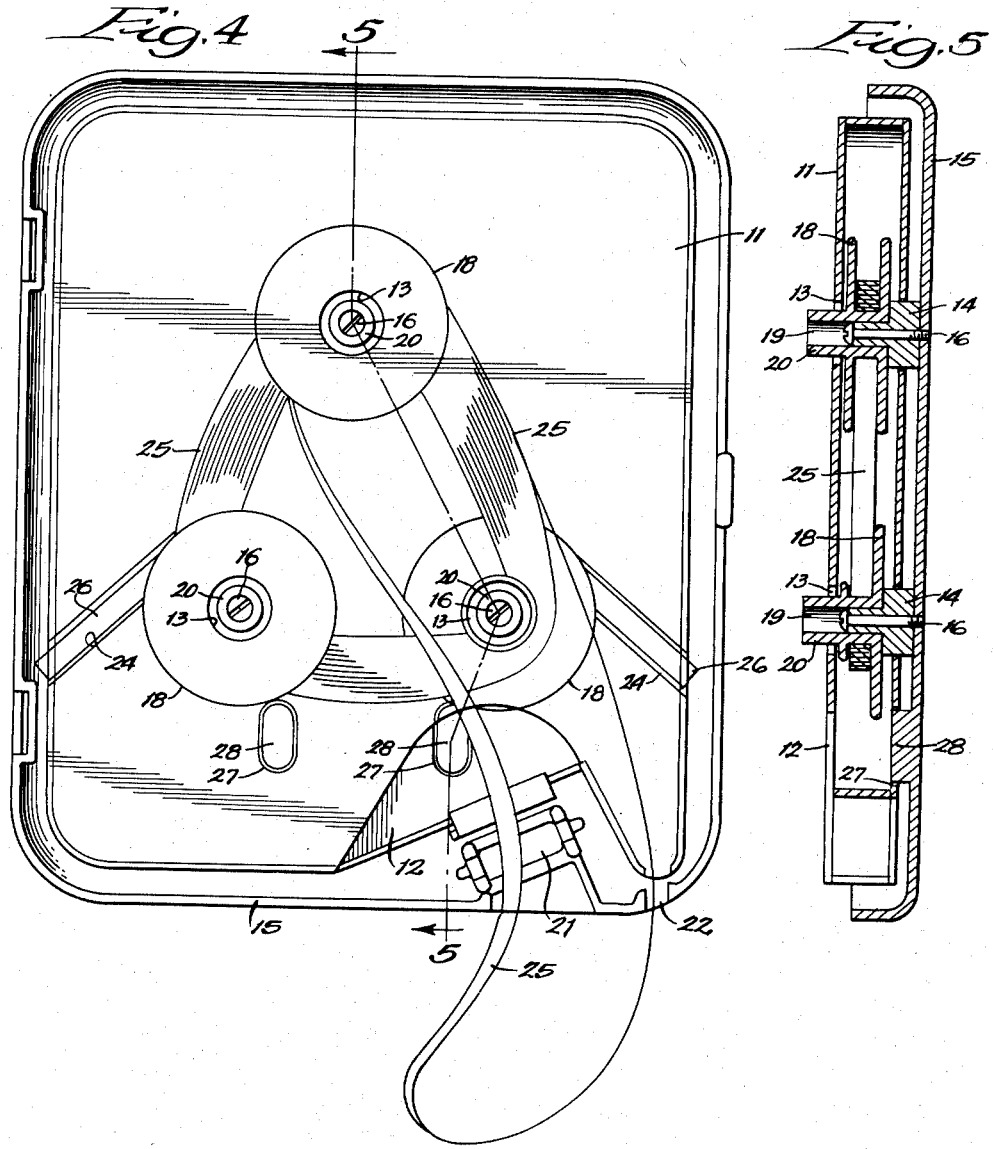
INVENTOR:
William C. Eddy,
BY
Dawson & Ooms
ATTORNEYS.

Patented Oct. 27, 1953

2,657,047

UNITED STATES PATENT OFFICE 2,657,047

CONTAINER FOR ENDLESS FILM REELS

William C. Eddy, Michigan City, Ind., assignor to Television Associates, Inc., Michigan City, Ind., a corporation of Illinois Application April 25, 1952, Serial No. 284,293

5 Claims. (Cl. 271—2.18)

This invention relates to film containers; in particular, it concerns a container adapted to serve as a permanent housing for an endless film reel, it being so designed as to protect the film against damage while at the same time facilitating application of the film to projectors, sound-tape reproducing devices, etc.

A widespread field of application exists for so-called "endless reel" films, both with respect to motion picture films and with respect to film strips or tapes used solely for recording sound.

For example, in educational work, the endless reel is highly desirable; the single reel containing an educational motion picture may be sent to a school, placed on a projector, displayed to the pupils, and then removed directly from the projector and returned to the film library. No rewinding is involved, and the degree of manual dexterity required for handling the film is considerably less than is required with conventional reels.

Another important application for the endless reel is in advertising messages. For example, a particular store may wish to greet each newly arriving customer with a message pointing out special bargains or sale items. With the endless reel, a tape phonograph can easily be caused, in response to an electric relay impulse governed by a door or an electric eye, to play the particular message desired each time an impulse is received.

In the past, endless reels have in general been stored and transported in complete film magazines provided with guide rollers and bearings therefor. That procedure has been expensive, since the film magazines have been of necessity rather expensive. Satisfactory operation of such a film magazine requires bearings which are accurately located and accurately machined to reduce friction to the absolute minimum.

More recently I have provided a less expensive means of storing and transporting endless film reels, comprising my storage container disclosed and claimed in my copending application, Serial No. 132,895, filed December 14, 1949. In that application, I taught the use of a light, inexpensive container formed of cardboard or the like and adapted to hold a coil of film in a position such that it can be inserted into a film magazine and the film thereupon engaged by guide rollers for projection or playback purposes.

That film-storage container has proved highly successful and has greatly simplified the task of endless-film storage and transportation. Its use requires, however, some degree of manual dexterity and experience, such that a wholly inexperienced person cannot handle it in connection with a film magazine without some risk of fouling the coil or permitting it to escape from its container.

When an endless-film reel escapes from its container and becomes tangled, the task of re-coiling it is a long and tiresome one, and it is extremely desirable, therefore, that a storage means be provided for endless-film coils which is not subject to the danger of film escape.

It is accordingly the principal object of the present invention to provide a closed container for an endless-film coil, sealable if desired, which may be incorporated in the film magazine of a projector or playback device without exposing the main portion of the film at any time.

Another object of the present invention is to provide a magazine or container for an endless coil of film or tape incorporating within it inexpensive guide rollers which are adapted for cooperation with permanent bearings which may be installed in the film magazine of a projector or playback device.

Still another object of my invention is to provide a container for endless-film coils wherein the guide rollers are so arranged and mounted as to provide a "locking" action when the container is not installed in a film magazine but operative to provide excellent low-friction moving support for the film when the container has been installed in a suitably designed magazine on the projector or playback device.

By accomplishing the objects above stated, I have, in the present invention, made it practical to supply endless-film coils for use by members of the general public without special training, thus opening up a large new field for application of the endless-film principle.

In the drawing which forms a part of this specification, I have shown a specific embodiment of my invention. Figure 1 shows, in perspective view, a film container according to my invention, as it appears when mounted in the film magazine of a projector or playback device adapted for use with my invention. Fig. 2 is a plan view in elevation of one of my film containers formed of transparent plastic material. Fig. 2 illustrates the "locking action" achieved by my film rollers when they are outside the film magazine and hence not riding on accurately placed and machined bearings. Fig. 3 is a sectional view of the structure of Fig. 2, the section being taken along line 3—3 of Fig. 2. Fig. 4 is a plan view similar to Fig. 2 except that the film container is in Fig. 4 shown as it appears mounted in a film magazine. Fig. 5 is a sectional view taken along the line 5—5 of Fig. 4.

My film container is provided with a casing portion 11 which is thin-walled and almost closed except for aperture 12, through which the free portion of the film emerges and returns, and apertures 13, which receive the guide rollers.

The body 11 may be made of any desired material, provided it be fairly rigid and mechanically strong enough to protect adequately the film carried within it. Stiff cardboard is a suitable material, as is any of the generally available sheet plastics, such as polyethylene. Likewise, sheet metal may be used if desired. In the drawing, I have shown casing 11 formed of transparent sheet plastic, so that the construction of the interior portion of the container may readily be observed.

On the top and bottom respectively of casing or housing 11 I have provided a plurality of pairs of apertures 13, each pair of apertures comprising an aperture in the bottom of the casing and a correspondingly located aperture in the top thereof. The apertures 13 provide access to the interior of the magazine for bearings 14, mounted on the back plate 15 of a film magazine which may be an integral part of or an accessory to a projector or playback device.

Bearings 14 must, in general, be accurately located and machined so as to permit movement of the film with a minimum of friction. Generally speaking, nylon has proved most successful as a material for bearings 14, the nylon bearings themselves being, of course, suitably secured to back plate 15 by screws 16 or other suitable mechanical equivalents thereof. Bearings of any other suitable material may, of course, be used.

It will be understood that the film magazine of which backing plate 15 and bearings 14 are parts is not of itself a part of the film container which comprises the present invention. The film magazine normally will be either an accessory to or an integral part of a projector or playback device.

Carried within the interior of casing 11 are a plurality of guide rollers or film spools 18. In the drawing, I have shown three spools 18, the number which normally will be used. In defining the present invention, I do not limit myself to any particular shape or conformation for the spools 18; for example, as may be seen from Fig. 3, I have in the present drawing shown two of the spools made with two extended flanges, so as to hold the film coil against lateral movement in either direction, while one of the spools 18 is shown with an extended flange on only its lower side, the upper flange being greatly reduced in diameter. The conformation of the film rollers is largely a matter of choice.

Each of the film rollers or spools 18 is provided with a drilled central aperture 19 adapted for cooperation with one of the bearings 14.

The rollers or spools 18 should preferably be made of a material which will be at once inexpensive and at the same time adapted for successful cooperation with bearings 14. I have found molded nylon to be a highly satisfactory material for the purpose.

Each of the rollers 18 is provided with an axial extension 20 on its upper side which projects outward through one of the apertures 13 so as to be accessible externally of casing 11. Extension 20, on each of the film rollers 18, extends loosely through an aperture 13; the cooperative action of aperture 13 and extension 20 thus holds the film guide members 18 in a generally defined position while leaving them free to move laterally within a limited range.

Along one edge of the side wall of casing 11 I have provided a smooth bearing surface 21 to receive film 25 as it passes outward from the inside of the coil wound around the film guide members 18. Similarly, I have provided a slot 22 to receive the film in its inward travel from the projector or playback device onto the outside of the coil.

Slots 24 may be formed in the under side of housing 11 to provide convenient alignment of the film cartridge within the magazine, the slots 24 being positioned to cooperate with corresponding ridges or longitudinal projections 26 molded or otherwise formed on the inner surface of back plate 15. For the same purpose, apertures 27 may be provided in the under side of housing 11, they being positioned for cooperation with bosses 28 on plate 15.

Operation

As may be understood from Figs. 1 and 2, an endless coil of film or tape is placed within casing 11 prior to its being finally closed. (Closure of casing 11 may be by cementing or any other suitable means; generally speaking, it is desirable that it be permanently closed, to give maximum protection to the film carried therewithin.)

In reproducing the motion pictures or sound information recorded on the film 25 one merely places the cartridge 11 into a suitable film magazine, and the rollers 18 are all seated on the bearings 14. The ridges 26 and bosses 28, with corresponding indexing apertures 24 and 27, make it easier to align the casing 11 properly within the magazine.

Once seated on the bearings 14, the rollers 18 will operate with exceedingly low friction. Thus it is a simple matter to withdraw a sufficient quantity of the film or tape 25 to thread it through the projector or playback device in the customary manner. The projector or playback device, when started, will then cause the film to move gradually through it, unwinding from the inside of the coil and winding up again on the outside.

When the film or tape has been played and is again to be stored, the portion of the film or tape lying outside the housing can be reduced to a minimum merely by manually rotating two of the rollers 18, access thereto being had via axial projections 20. (If desired, knobs may be added to two or more of the axial projections 20, to facilitate further the re-winding operation.) It will be understood that at most only a few feet of tape will be outside the container 11 when it is removed from the film magazine. Thus the re-winding job is a simple one requiring only seconds of time.

As soon as the film cartridge 11 has been removed from the film magazine, and rollers 18 have hence been removed from bearings 14, the natural tension of the film coil will pull the rollers 18 as close as possible to one another, causing them to rub against the walls of the apertures 13, as shown best in Figs. 2 and 3. At the same time the rollers drop to the bottom of the magazine so that the flat bottom flanges of the rollers 18 are in surface contact over a large area with the inside surface of the bottom of cartridge 11. This positioning of the rollers 18 greatly increases their rotary friction and thus raises sharply the amount of force that must be exerted to unwind the tape or film. Thus, when my film cartridge is removed from a film magazine and rollers 18 are not operating on bearings, the film is "locked" against unwinding. The aforesaid "lock" is of course not positive; such a positive lock would be undesirable. The friction of the rollers 18 against the sides of the apertures 13 and the bottom of casing 11 makes it sufficiently difficult, however, to uncoil film as to make its accidental uncoiling virtually impossible. With the instrument out of a film magazine, the film does not unwind. This excellent quality sharply distinguishes my present invention from many prior-art film carriers.

While I have in the present specification described in considerable detail a particular embodiment of my invention, it is to be understood that numerous changes therein can be made without departing from the spirit of the invention. It is therefore my desire that the scope of my invention be determined primarily with reference to the appended claims.

I claim:

1. A cartridge for an endless coil of film or tape comprising a hollow casing having top and bottom walls substantially closed save for a plurality of pairs of openings, each such pair comprising an opening in the bottom wall and a corresponding opening in the top wall, and a plurality of rotatable film-guide rollers within said casing, each such roller having an axial aperture adapted for low-friction cooperation with a bearing and having also an axial extension surrounding said aperture and extending into one of said openings, said last-mentioned opening being larger than said extension, whereby said rollers, when not mounted on bearings, are free to move laterally within limits determined by said openings and said extensions.

2. Apparatus according to claim 1 wherein said extensions project through said openings externally of said casing, providing means for manual rotation of said rollers.

3. Apparatus according to claim 1 wherein one of the walls of said casing is provided with indexing means for facilitating the fitting of said casing into a film magazine.

4. Apparatus according to claim 1 wherein said extensions project through said openings externally of said casing, providing external access to said rollers for manual rotation thereof, and wherein the wall of said casing opposite the wall receiving said extensions is provided with indexing slots facilitating the positioning of said casing into a film magazine.

5. A cartridge for an endless coil of film or tape comprising a hollow casing having top and bottom walls, one of said walls being provided with a plurality of openings, and a plurality of rotatable guide rollers within said casing, each such roller being modified for cooperation with a bearing and having an axial extension extending through one of said openings and accessible externally of the casing, said opening being larger respectively than said extensions passing therethrough, whereby said rollers, when not mounted on bearings, are free to move laterally to a limited extent.

WILLIAM C. EDDY.

No references cited.